US008004985B2

(12) United States Patent
Shimonishi

(10) Patent No.: US 8,004,985 B2
(45) Date of Patent: Aug. 23, 2011

(54) COMMUNICATION TERMINAL WHICH PERFORM LOW-DELAY COMMUNICATION BY USING A BROADBAND LINE

(75) Inventor: Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 233 days.

(21) Appl. No.: 12/024,685

(22) Filed: Feb. 1, 2008

(65) Prior Publication Data

US 2008/0212480 A1    Sep. 4, 2008

(30) Foreign Application Priority Data

Feb. 2, 2007    (JP) ................................ 2007-024525

(51) Int. Cl.
*H04J 3/14* (2006.01)
(52) U.S. Cl. ......... 370/232; 370/253; 709/228; 709/232
(58) Field of Classification Search .......... 370/229–234, 370/394; 709/235
See application file for complete search history.

(56) References Cited

U.S. PATENT DOCUMENTS

| | | | | |
|---|---|---|---|---|
| 5,802,106 | A * | 9/1998 | Packer | 370/229 |
| 6,119,235 | A * | 9/2000 | Vaid et al. | 709/235 |
| 6,622,172 | B1 * | 9/2003 | Tam | 709/232 |
| 2001/0015956 | A1 * | 8/2001 | Ono | 370/229 |
| 2003/0021231 | A1 * | 1/2003 | Evans | 370/230 |
| 2005/0286416 | A1 * | 12/2005 | Shimonishi et al. | 370/229 |
| 2006/0209838 | A1 * | 9/2006 | Jung et al. | 370/394 |
| 2008/0043621 | A1 * | 2/2008 | Hatime | 370/234 |

FOREIGN PATENT DOCUMENTS

| | | |
|---|---|---|
| JP | 2000-216811 A | 8/2000 |
| JP | 2000-295286 A | 10/2000 |
| JP | 2004-153776 A | 5/2004 |
| JP | 3642780 B2 | 2/2005 |
| JP | 2005-517330 A | 6/2005 |
| JP | 2006-512843 A | 4/2006 |
| JP | 2006-279283 A | 10/2006 |
| JP | 2006-340078 A | 12/2006 |

OTHER PUBLICATIONS

Koichi Yano. Rate control method based on round-trip time suitable for real-time transfer of continuous media. Journal of the IEICE, Institute of Electronics, Information and Communication Engineers, Apr. 23, 1998, vol. 98, No. 11, p. 85 to p. 90.
"Processor Sharing Flows in the Internet" (Nandita Dukkipati, Masayoshi Kobayashi, Rui Zhang-Shen, Nick Mckeown, 2005.
Fast TCP: From Theory to Experiments. Cheng Jin, et al. UCLA; Jan. 2005.

\* cited by examiner

*Primary Examiner* — Kwang B Yao
*Assistant Examiner* — Jeffrey M Rutkowski
(74) *Attorney, Agent, or Firm* — Sughrue Mion, PLLC

(57) ABSTRACT

A communication terminal which sets a communication session between a plurality of communication terminals through a network to perform data transmission and reception includes a measuring unit which measures round-trip delay time (RTT) or one-way delay time between the communication terminals for performing transmission and reception on the basis of the received acknowledgement, a reception bandwidth measuring unit which measures a reception bandwidth in a reception terminal of the communication terminals on the basis of the received acknowledgement, a correcting unit which corrects a value of the round-trip delay time or the one-way delay time by using at least the reception bandwidth, and a transmission bandwidth determining unit which determines a transmission bandwidth on the basis of the value of the corrected round-trip delay time or the corrected one-way delay time.

16 Claims, 11 Drawing Sheets

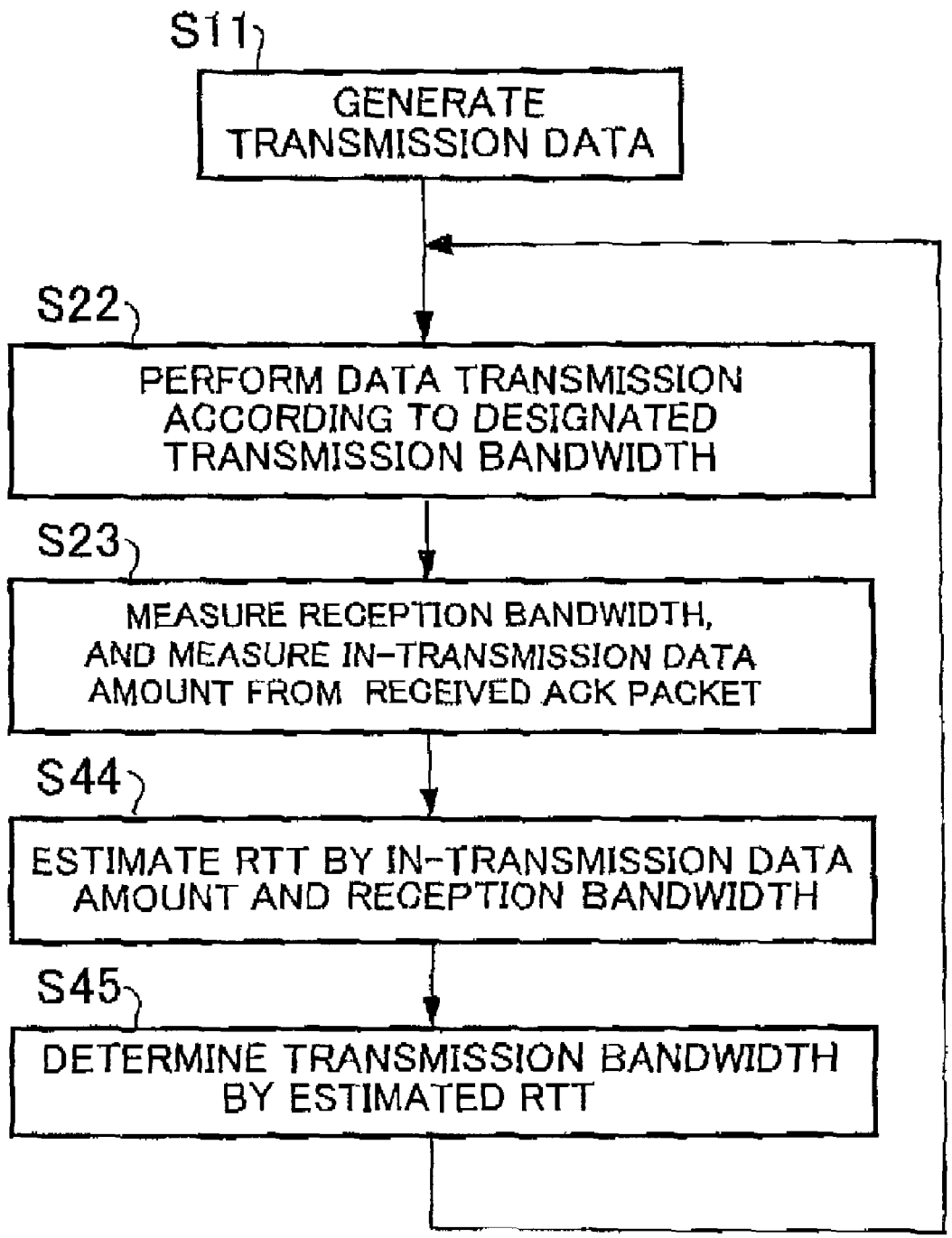

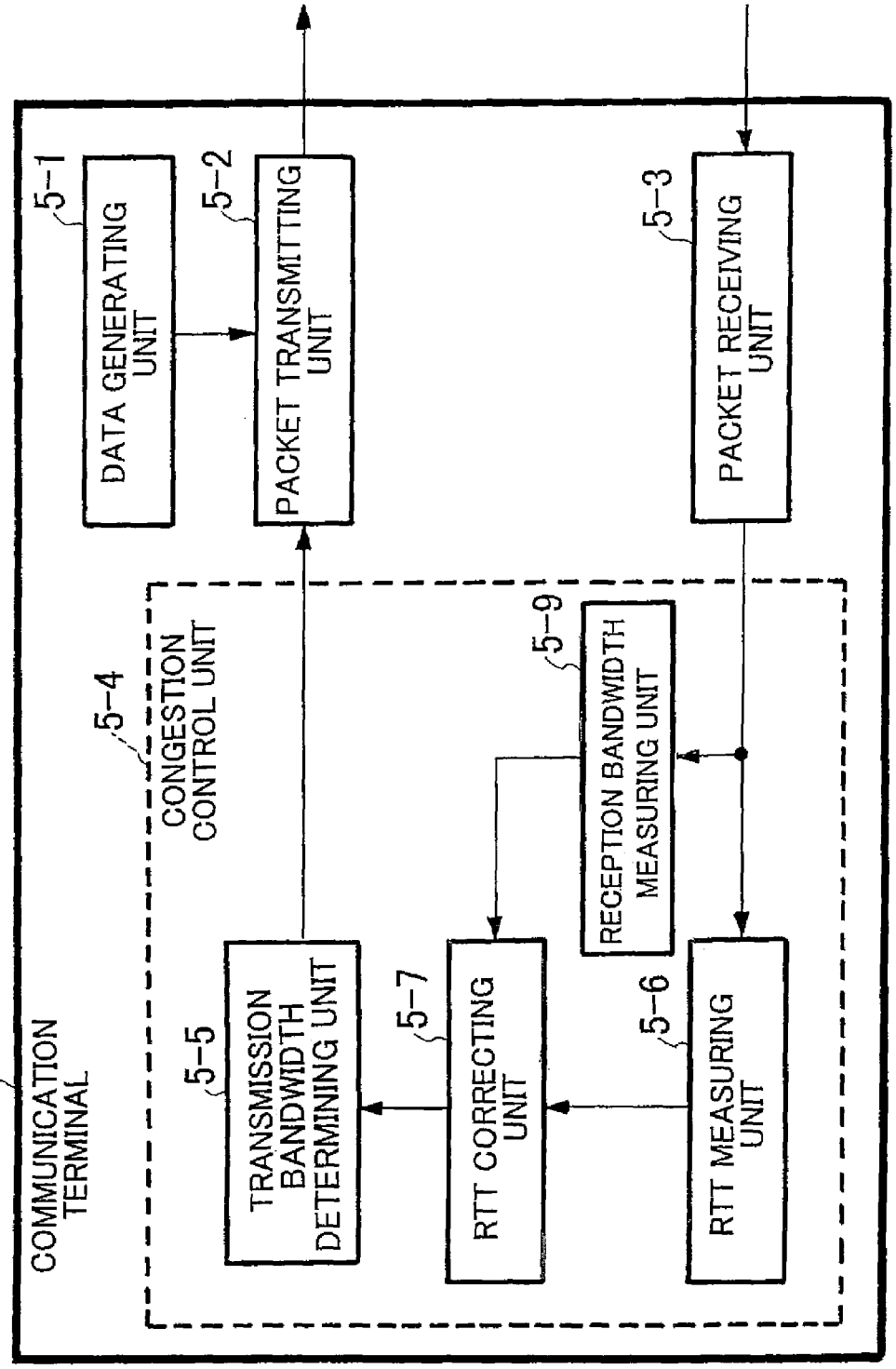

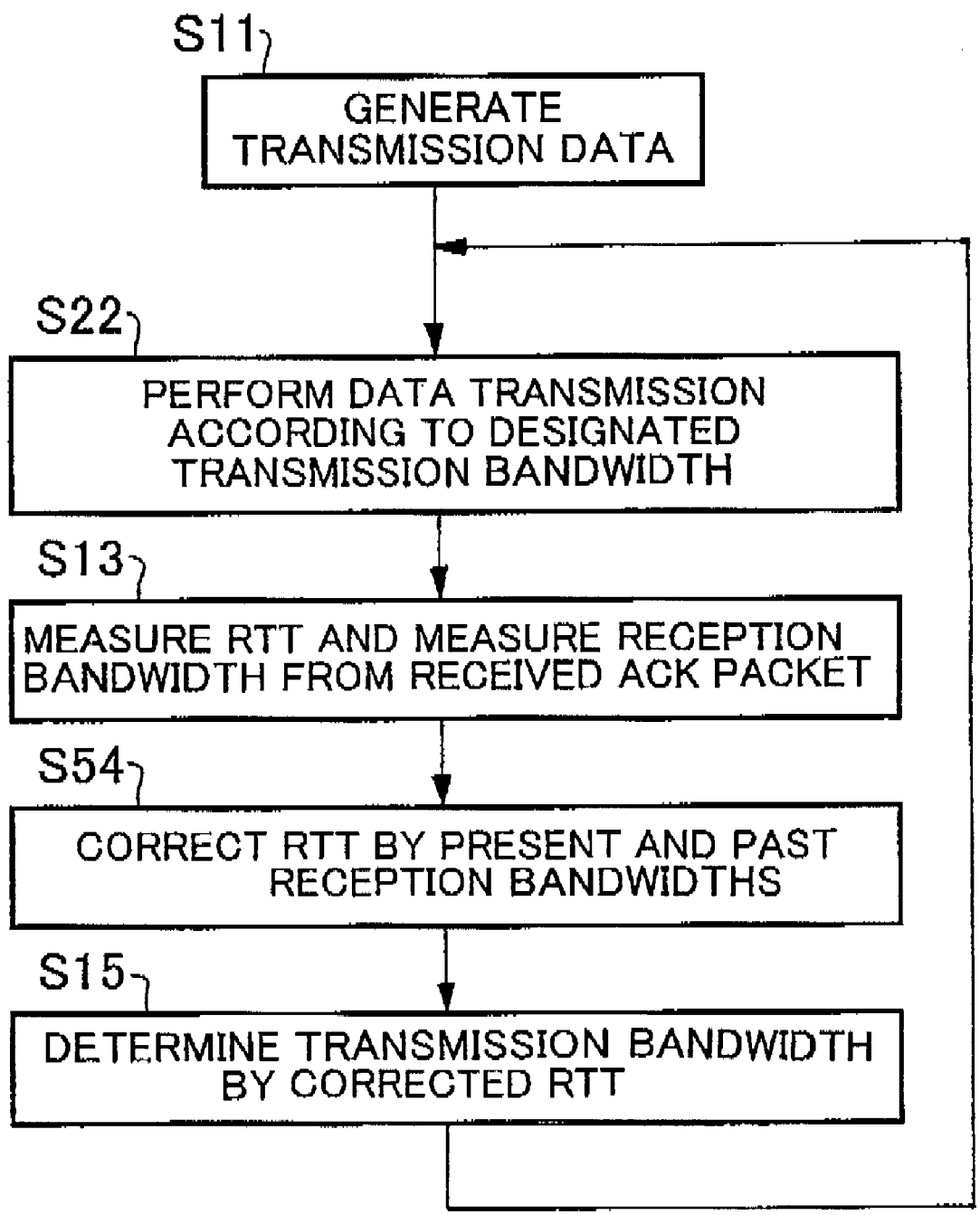

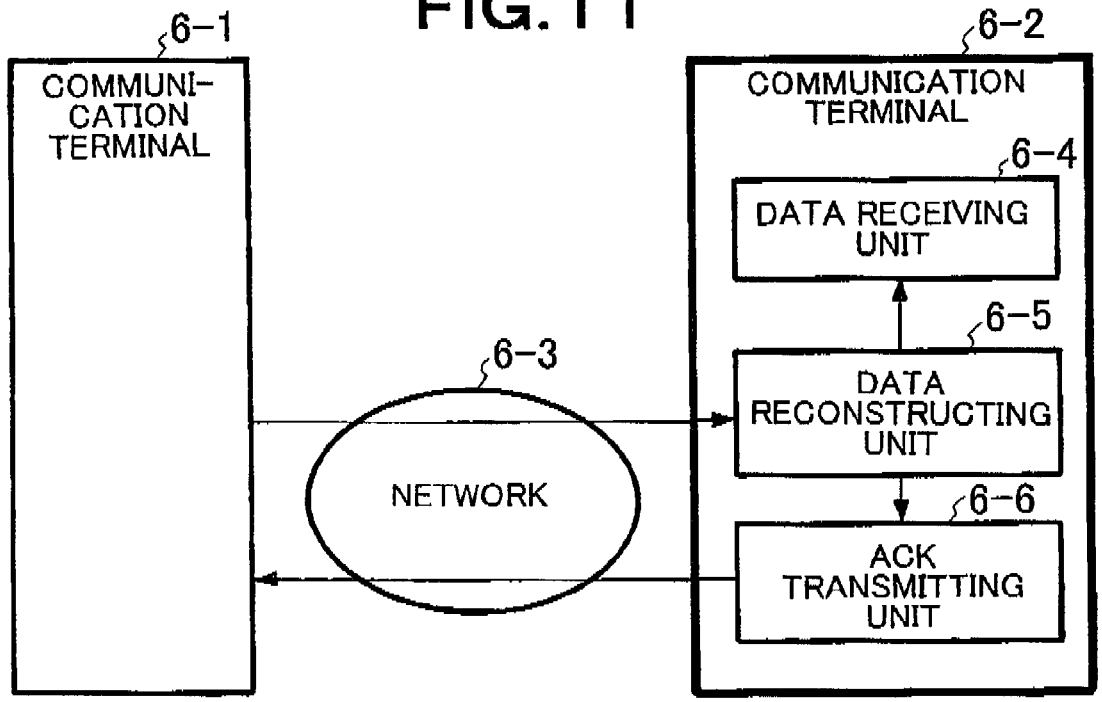
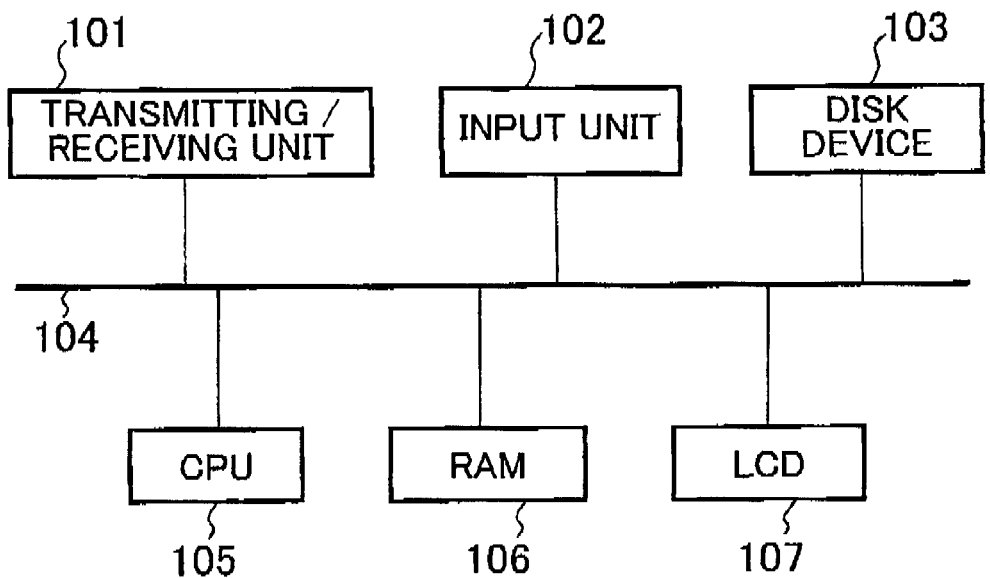

COMMUNICATION TERMINAL WHICH PERFORM LOW-DELAY COMMUNICATION BY USING A BROADBAND LINE

BACKGROUND OF THE INVENTION

1. Field of the Invention

The present invention relates to a communication terminal, a communication system, a congestion control method, and a congestion control program, and particular, a communication terminal, a communication system, a congestion control method, and a congestion control program which perform low-delay communication by using a broadband line.

This application is based upon and claims the benefit of priority from Japanese patent application No. 2007-024525, filed on Feb. 2, 2007, the disclosure of which is incorporated herein in its entirety by reference.

2. Related Art

In communication through a network, in order to low-delay communication between transmission and reception terminals, delay time by a queueing delay in the network is required to be shortened. A minimum value of delay between the transmission and reception terminals is propagation delay time between the transmission and reception terminals, and communication with delay shorter than the propagation delay time may not be able to be performed. When congestion occurs in the network, a queue to wait for a packet output is generated in a node where the congestion occurs, and delay between the transmission and reception terminals is increased by time for which the packet passes through the queue. When the queue becomes long over a buffer capacity of the congested node, packet discard is generated. For this reason, the delay time between the transmission and reception terminals considerably increases by time required for packet retransmission. In this manner, in order to perform low-delay communication, a queueing delay in the node in the network must be reduced.

The most effective method serving as a method for reducing a queueing delay is a method which stores only low-delay communication in a queue having an especially high priority in the in-network node to preferentially output a packet. For example, a method achieved by Differentiated Service (Internet Engineering Task Force, Request For Comments 2475) and the like are given. However, in this method, a special device in the in-network node is required, a queueing delay still occurs when a plurality of low-delay communications are simultaneously performed.

As another method, a method in which an in-network node explicitly notifies a transmission terminal of congestion information may be used. As this method, an ECN (Explicit Congestion Notification, Internet Engineering Task Force, Request For Comments 3168) method in which a degree of congestion of a node is written in a packet header to notify a transmission terminal of the packet or a method in which an optimum transmission bandwidth of each communication is calculated and is communicated to the transmission terminal as described in "Processor Sharing Flows in the Internet" (Nandita Dukkipati, Masayoshi Kobayashi, Rui Zhang-Shen, Nick MacKeown, Thirteenth International Workshop on quality of Service (IWQoS)), and the like are known. However, these methods require special devices in in-network nodes, and cost for switching existing nodes is necessary.

As techniques different from the above methods, the following techniques for realizing low-delay communication by congestion control between transmission and reception terminals are known.

In the first related art is a technique which sets a maximum value of a transmission bandwidth depending on a bandwidth of a network. In this technique, an excessive transmission bandwidth over the bandwidth is prevented from being set, so that an unnecessary queueing delay or packet waste can be prevented. For example, in the method described in Japanese Patent Application Laid-Open (JP-A) No. 2006-279283, an optimum communication bandwidth is estimated during TCP communication, and congestion control is performed such that a transmission bandwidth does not exceed the communication bandwidth. In this manner, unnecessary congestion is prevented to make data transmission delay time short.

The second related art is a technique which determines a transmission bandwidth on the basis of one-way delay time or round-trip delay time measured by a transmission terminal. In this technique, when delay time increases, by reducing a transmission bandwidth, congestion control is performed in the transmission terminal to keep a queueing delay short. For example, in TCP-FAST method (From Theory to Experiments, C. Jin, D. X. Wei, S. H. Low, G. Buhrmaster, J. Bunn, D. H. Choe, R. L. A. Cottrell, J. C. Doyle, W. Feng, 0. Martin, H. Newman, F. Paganini, S. Ravot, S. Singh. IEEE network, 19(1): 4-11, Jan./Feb. 2005), round-trip propagation delay time of a network is measured, by using a value (corresponding to a data amount in a corresponding communication which is caused to wait by a queue in a node) obtained by multiplying a difference between the minimum value of the round-trip propagation delay time and a present value by a present transmission bandwidth, the transmission bandwidth is controlled such that the value is induced to be a predetermined target value, so that the transmission bandwidth is controlled to an optimum bandwidth.

As techniques related to the present invention, JP-A No. 2000-295286, JP-A No. 2004-153776, JP-A No. 2006-340078, and JP-A No. 2005-517330 are known.

A disadvantage of the first related art is that when a plurality of sessions are present, even though a limited bandwidth of each of the sessions is a bandwidth or less, a total of limited bandwidths of these sessions exceeds the bandwidth. For this reason, when a plurality of sessions are present, a queueing delay becomes long.

A disadvantage of the second related art is that a packet having a set data amount is stationarily accumulated, and the number of accumulated packets varies to considerably vary delay time. In order to perform low-delay communication, a transmission bandwidth must be early achieved to an optimum transmission. For this purpose, an increase range of the transmission bandwidth must be set to be large. However, when the increase range of the transmission bandwidth is set, a large number of packets reach a network node for a short period of time. For this reason, a queue length considerably increases within a short period of time. However, time taken until congestion is communicated to a transmission terminal becomes long due to the increase in queueing delay. As a result, when a transmission bandwidth is sharply increased, time taken until the transmission bandwidth is reduced accordingly after the congestion occurs becomes long. As a result, the queue length becomes unstable. Furthermore, in the first related art, the number of packets stationarily accumulated in a queue disadvantageously linearly increases depending on an increase in number of sessions.

SUMMARY OF THE INVENTION

It is a first exemplary object of the present invention to suppress a total of bandwidths of even a plurality of sessions to a bandwidth or less and to, consequently, shorten delay time between transmission and reception terminals.

It is a second exemplary object of the present invention to converge a queueing delay to a small value without varying the queueing delay even though an increase range of a transmission bandwidth is increased or the number of sessions is large and to, consequently, shorten delay time between transmission and reception terminals.

In order to achieve the above objects, according to a first exemplary aspect of the present invention, there is provided a communication terminal used in a communication system which sets a communication session between a plurality of communication terminals through a network to perform data transmission and reception, including:

a unit which measures round-trip delay time or one-way delay time between the communication terminal and another terminal for performing transmission and reception with the communication terminal, on the basis of received acknowledgement from the another terminal, a reception bandwidth measuring unit which measures a reception bandwidth in the another terminal on the basis of the received acknowledgement;

a correcting unit which corrects a value of the round-trip delay time or the one-way delay time by using at least the reception bandwidth; and a determining unit which determines a transmission bandwidth by the round-trip delay time or one-way delay time corrected by the correcting unit.

According to a second exemplary aspect of the present invention, there is provided a terminal used in a communication system which sets a communication session between a plurality of communication terminals through a network to perform data transmission and reception, including:

a unit which measures an amount of in-transmission data;

a reception bandwidth measuring unit which measures a reception bandwidth in another terminal for performing transmission and reception with the communication terminal, on the basis of received acknowledgement from the another terminal;

an estimating unit which sets a value obtained by dividing the measured amount of in-transmission data by the reception bandwidth as the round-trip delay time or one-way delay time; and a determining unit which determines a transmission bandwidth by the round-trip delay time or one-way delay time estimated by the estimating unit.

According to a third exemplary aspect of the present invention, there is provided a communication terminal used in a communication system which sets a communication session between a plurality of communication terminals through a network to perform data transmission and reception, comprising:

a unit which estimates an amount of data caused to wait in a queue in the network and controls a transmission bandwidth by a difference between the amount of data and a target value thereof; and a unit which measures round-trip delay time or one-way delay time between the communication terminal and another terminal for performing transmission and reception with the communication terminal, wherein the target value is dynamically changed as a decreasing function of the round-trip delay time or one-way delay time.

According to a fourth exemplary aspect of the present invention, there is provided a communication terminal used in a communication system which sets a communication session between a plurality of communication terminals through a network to perform data transmission and reception, comprising:

a unit which estimates an amount of data caused to wait in a queue in the network and controls a transmission bandwidth by a difference between the amount of data and a target value thereof, and a unit which measures round-trip delay time or one-way delay time between the communication terminal and another terminal for performing transmission and reception with the communication terminal, wherein the target value is multiplied by at least one of a link bandwidth, a value obtained by dividing the link bandwidth by the transmission bandwidth, the round-trip delay time, and the minimum value of the round-trip delay time.

According to a fifth exemplary aspect of the present invention, there is provided a communication terminal used in a communication system which sets a communication session between a plurality of communication terminals through a network to perform data transmission and reception, comprising:

a unit which estimates an amount of data caused to wait in a queue in the network;

a unit which controls a transmission bandwidth by a difference between the amount of data and a target value thereof, and a unit which measures round-trip delay time or one-way delay time between the communication terminal and another terminal for performing transmission and reception with the communication terminal, wherein the unit which estimates the amount of data multiplies the estimated amount of data by the round-trip delay time or the minimum number of the round-trip delay time.

According to a sixth exemplary aspect of the present invention, there is provided a congestion control method in a communication terminal of a communication system which sets a communication session between a plurality of communication terminals through a network to perform data transmission and reception, including:

the first step of measuring round-trip delay time or one-way delay time between the communication terminal and another terminal for performing transmission and reception with the communication terminal, and measuring a reception bandwidth in the another terminal, on the basis of received acknowledgement from the another terminal;

the second step of correcting a value of the round-trip delay time or the one-way delay time by using at least the reception bandwidth; and the third step of determining a transmission bandwidth by the round-trip delay time or one-way delay time corrected in the second step.

According to still a seventh exemplary aspect of the present invention, there is provided a congestion control method in a communication terminal of a communication system which sets a communication session between a plurality of communication terminals through a network to perform data transmission and reception, including:

the first step of measuring an amount of in-transmission data;

the second step of measuring a reception bandwidth in another terminal for performing transmission and reception with the communication terminal, on the basis of received acknowledgement from the another terminal;

the third step of setting a value obtained by dividing the measured amount of in-transmission data by the reception bandwidth as round-trip delay time or one-way delay time; and the fourth step of determining a transmission bandwidth by the round-trip delay time or one-way delay time estimated in the third step.

According to still an eighth exemplary aspect of the present invention, there is provided a program to cause a computer serving as a communication terminal of a communication system which sets a communication session between a plurality of communication terminals through a network to perform data transmission and reception to execute the steps of:

the first step of measuring round-trip delay time or one-way delay time between the communication terminal and another terminal for performing transmission and reception with the communication terminal, and measuring a reception bandwidth in the another terminal, on the basis of received acknowledgement from the another terminal;

the second step of correcting a value of the round-trip delay time or the one-way delay time by using at least the reception bandwidth; and the third step of determining a transmission bandwidth by the round-trip delay time or one-way delay time corrected in the second step.

According to still a ninth exemplary aspect of the present invention, there is provided a program to cause a computer serving as a communication terminal of a communication system which sets a communication session between a plurality of communication terminals through a network to perform data transmission and reception to execute the steps of:

the first step of measuring an amount of in-transmission data;

the second step of measuring a reception bandwidth in another terminal for performing transmission and reception with the communication terminal, on the basis of received acknowledgement from the another terminal;

the third step of setting a value obtained by dividing the measured amount of in-transmission data by the reception bandwidth as round-trip delay time or one-way delay time; and the fourth step of determining a transmission bandwidth by the round-trip delay time or one-way delay time estimated in the third step.

BRIEF DESCRIPTION OF THE DRAWINGS

FIG. 8 is a flow chart showing an operation of a communication terminal according to the fourth embodiment;

FIG. 9 is a block diagram showing a configuration of a terminal according to a fifth embodiment of the present invention;

FIG. 10 is a flow chart showing an operation of a terminal according to a sixth embodiment of the present invention;

FIG. 11 is a block diagram showing a configuration of a system according to an embodiment of the present invention; and FIG. 12 is a block diagram showing an example of a configuration of a computer.

DETAILED DESCRIPTION OF PREFERRED EMBODIMENTS

Hereinafter, exemplary embodiments of the present invention will be described in detail with reference to the drawings.

First Exemplary Embodiment

A first exemplary embodiment of the present invention will be described below with reference to drawings.

(Explanation of Configuration)

Figure 1:
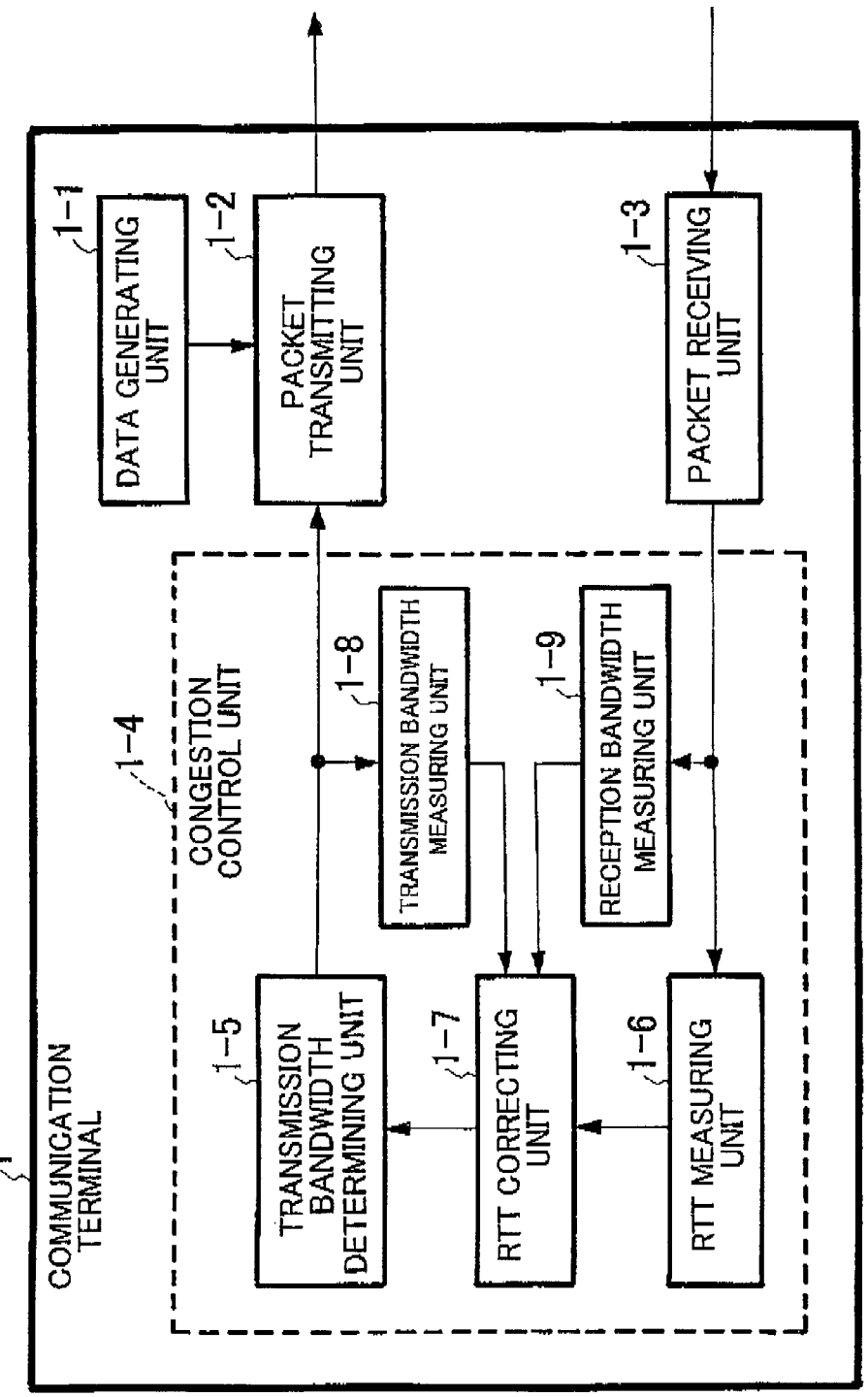
FIG. 1 is a block diagram showing a configuration of a terminal according to a first embodiment of the present invention.

FIG. 1 is a block diagram showing a configuration of a communication terminal 1 according to the exemplary embodiment. The communication terminal 1 serving as a transmission terminal is constituted by a data generating unit 1-1 which generates transmission data, a packet transmitting unit 1-2 which outputs communication data to a network, a packet receiving unit 1-3 which receives an acknowledgement packet (ACK packet) from another communication terminal (reception terminal) which communicates with the communication terminal 1, and a congestion control unit 1-4 which designates a transmission bandwidth for the packet transmitting unit 1-2.

The congestion control unit 1-4 is constituted by an RTT (Round Trip Time) measuring unit 1-6 which measures round-trip delay time each time an ACK packet is received, a transmission bandwidth measuring unit 1-8 which measures a transmission bandwidth, a reception bandwidth measuring unit 1-9 which measures a reception bandwidth, an RTT correcting unit 1-7 which corrects the RTT measured by the values of a transmission bandwidth and a reception bandwidth, and a transmission bandwidth determining unit 1-5 which determines the transmission bandwidth on the basis of the RTT. In this case, the RTT means a period of time when one packet is transmitted from a transmission source to a destination and returns to the transmission source.

(Explanation of Operation)

Figure 2:
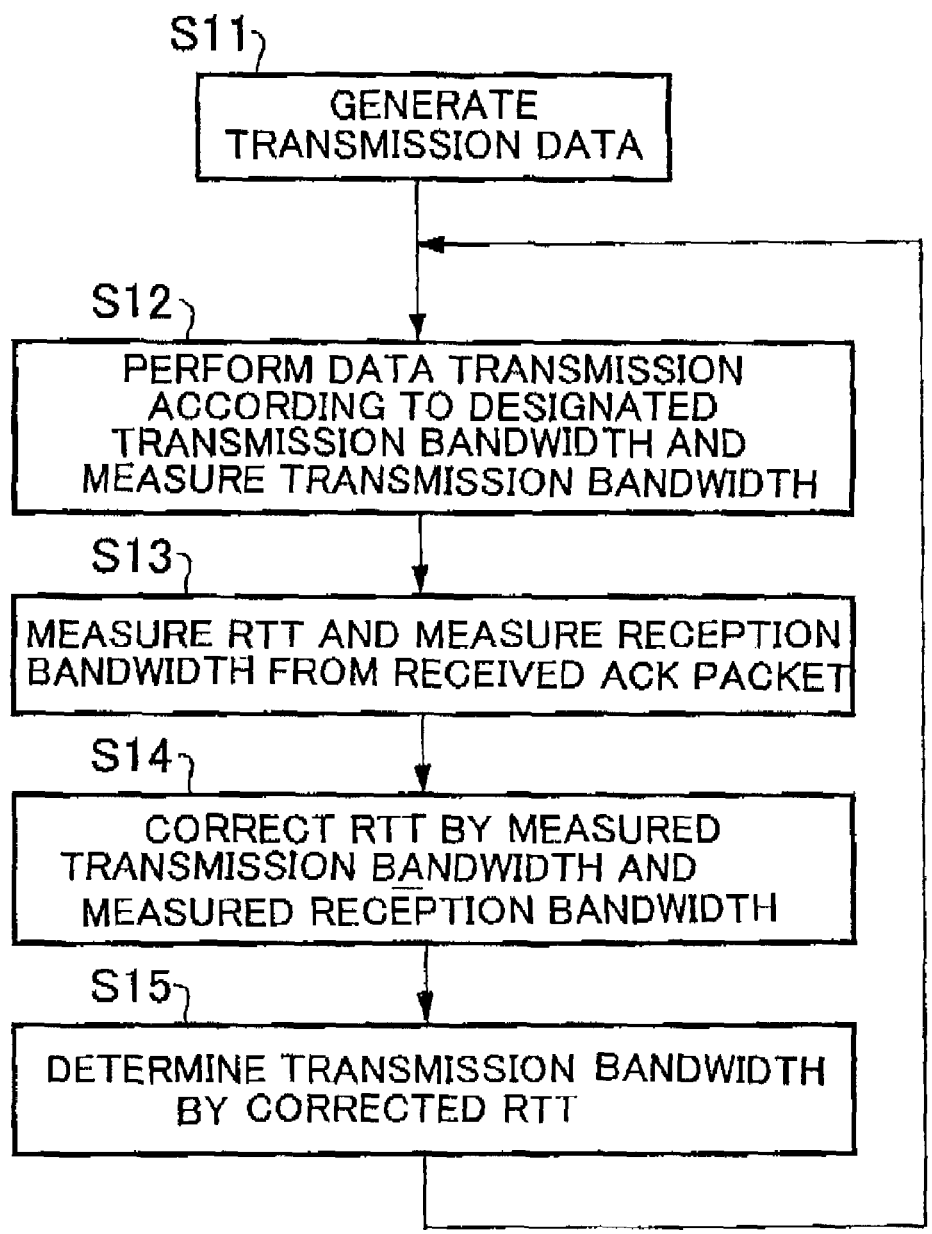
FIG. 2 is a flow chart showing an operation of a communication terminal according to the first embodiment.

An operation of the exemplary embodiment will be described below with reference to FIGS. 1 and 2. FIG. 2 is a flow chart showing an operation of the communication terminal 1.

When transmission data is generated in the data generating unit 1-1 (step S11), the packet transmitting unit 1-2 packets the transmission data and transmits the packet according to a transmission bandwidth designated by the transmission bandwidth determining unit 1-5 of the congestion control unit 1-4 (step S12). At this time, in the transmission bandwidth measuring unit 1-8, a transmission bandwidth is measured (step S12). This may be a value obtained by dividing an amount of data transmitted for a predetermined period of time by the reception time as expressed in the following equation:

$$\text{measured transmission bandwidth} = (\text{amount of data transmitted between time } t1 \text{ and time } t2)/(t2-t1)$$

As expressed in the following equation, the transmission bandwidth may be a measured transmission bandwidth cal culated by calculating an index average each time a packet is transmitted.

> Measured transmission bandwidth=(previously calculated transmission bandwidth×coefficient)+((currently transmitted data amount)/(current packet transmission time−previous packet transmission time))×(1−coefficient)

In the transmission bandwidth measuring unit 1-8, a value of the transmission bandwidth calculated by the transmission bandwidth determining unit 1-5 may be used without using the measured transmission bandwidth.

When the ACK packet corresponding to the transmitted packet reaches the packet receiving unit 1-3, the RTT measuring unit 1-6 measures round trip time related to the packet and a minimum value (RTTmin) of the round trip time from the start of the transmission (step S13).

In the exemplary embodiment, although the round trip time (RTT) is used as delay, one-way delay time may be used in place of the round trip time. As a method for deriving the one-way delay time, the following method or the like can be used. That is, for example, a transmission terminal writes transmission time in a packet header during packet transmission, and a reception terminal which receives the packet calculates a difference between the transmission time and packet reception time as a one-way delay and writes the calculated value in the ACK packet to notify the transmission terminal of the calculated value.

In the reception bandwidth measuring unit 1-9, a reception bandwidth in the reception terminal is measured from an amount of data which is confirmed to be received by an ACK packet (step S13). This may be a value obtained by dividing the amount of data confirmed to be received for a predetermined period of time by the reception time as expressed by the following equation.

> Reception bandwidth=(amount of data confirmed to be received for time between time $t1$ and time $t2$)/($t2-t1$)

As expressed by the following equation, a reception bandwidth calculated by calculating an index average each time an ACK packet is received may be used.

> Reception bandwidth=(previously calculated reception bandwidth×coefficient)+((amount of data confirmed to be received by current ACK packet)/(current ACK packet arrival time−previous ACK packet arrival time))×(1−coefficient)

In the RTT correcting unit 1-4, the RTT is corrected by a balance between the measured transmission bandwidth and the reception bandwidth (step S14). For example, the corrected RTT may be calculated by the following equation:

> Corrected RTT=max(measured $RTT$×(measured transmission bandwidth/reception bandwidth), measured $RTT$min)

More specifically, the corrected RTT is a large one of measured RTT×(measured transmission bandwidth/reception bandwidth) and the measured RTTmin.

Furthermore, the corrected RTT may be calculated by the following equation:

> Corrected RTT=max(measured $RTT$×(measured transmission bandwidth/reception bandwidth), measured $RTT$)

More specifically, the corrected RTT is a large one of measured RTT×(measured transmission bandwidth/reception bandwidth) and the measured RTT.

In this case, the latest measured values are used as the measured transmission bandwidth and the reception bandwidth. However, a measured value obtained 1 RTT ago may be used as the measured transmission bandwidth to adjust measurement time of the measured transmission bandwidth to a packet to measurement time of the reception bandwidth to the packet.

The transmission bandwidth determining unit 1-5 controls a transmission bandwidth by using the value of the corrected RTT (step S15). The controlled transmission bandwidth is a transmission bandwidth designated in step S12. As a control method for the transmission bandwidth, any control method using RTT is arbitrarily used. For example, a calculation may be performed by using the following equation:

> transmission bandwidth=previously calculated transmission bandwidth+($\alpha/RTT$−($RTT-RTT$min)/$RTT$×previously calculated transmission bandwidth)×time constant As the time constant, for example, a value calculated by (time at current calculation−time at previous calculation) * RTT is used. The value $\alpha$ is a parameter for determining an increase rate of the transmission bandwidth. By using the following equation in place of the above calculation, the same effect is obtained. In the above equation, "*" means "×" (more specifically, the "*" means multiplication). This is also applied to the following equation.

> Transmission bandwidth=previously calculated transmission bandwidth+($\alpha/RTT$−(previously calculated transmission bandwidth−reception bandwidth))×time constant In the above description, a congestion control method using control of a transmission bandwidth is explained. However, the above method can also be applied to a congestion control method using window flow control such as TCP (Transmission Control Protocol). In this case, the following calculating formula can be changed as described below.

> Transmission window=previous calculated transmission window+($\alpha$−($RTT-RTT$min)/$RTT$×previously calculated transmission window)/previously calculated transmission window When a degree of congestion of a network increases, the reception bandwidth is temporarily smaller than the transmission bandwidth. When the transmission bandwidth is larger than the optimum value, the transmission bandwidth is temporarily larger than the reception bandwidth. In this manner, the transmission bandwidth must be reduced, a ratio of the transmission bandwidth to the reception bandwidth temporarily changes, and, thereafter, a queuing delay begins to extend to increase RTT. More specifically, since the change of the ratio appears as a phenomenon prior to the change of the RTT, congestion control is performed with the change of the ratio, or the value of the RTT is corrected by the change of the ratio to make it possible to early control congestion.

Since a transmission bandwidth can be controlled earlier than a change in measured RTT, a queueing delay can be converged to a small value without varying the queueing delay. As a result, delay time between transmission and reception terminals can be shortened.

Second Exemplary Embodiment

A second exemplary embodiment of the present invention will be described below with reference to the accompanying drawings.

(Explanation of Configuration)

Figure 3:
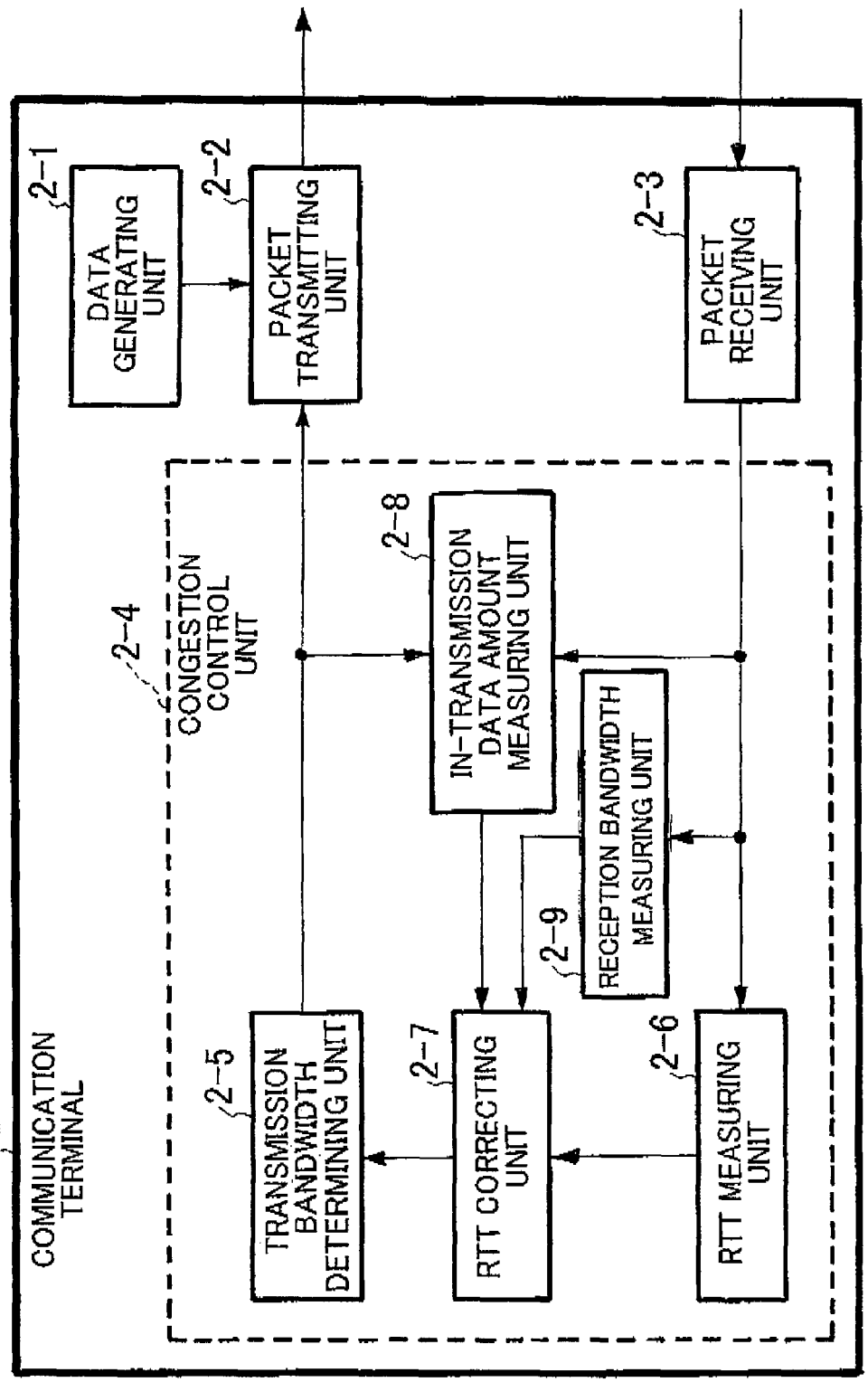
FIG. 3 is a block diagram showing a configuration of a terminal according to a second embodiment of the present invention.

FIG. 3 is a block diagram showing a configuration of a communication terminal 2 according to the second exemplary embodiment. The second exemplary embodiment is different from the first exemplary embodiment in that an in-transmission data amount measuring unit is arranged in place of the transmission bandwidth measuring unit.

The communication terminal 2 is constituted by a data generating unit 2-1 which generates transmission data, a packet transmitting unit 2-2 which outputs communication data to a network, a packet receiving unit 2-3 which receives an acknowledgement packet (ACK packet) from a reception terminal, and a congestion control unit 2-4 which designates a transmission bandwidth for the packet transmitting unit 2-2.

The congestion control unit 2-4 is constituted by an RTT measuring unit 2-6 which measures round-trip delay time each time an ACK packet is received, an in-transmission data amount measuring unit 2-8 which measures an amount of in-transmission data the ACK of which is not received, a reception bandwidth measuring unit 2-9 which measures a reception bandwidth, an RTT correcting unit 2-7 which corrects the RTT measured by using the reception bandwidth and the value of the amount of in-transmission data, and a transmission bandwidth determining unit 2-5 which determines a transmission bandwidth on the basis of the RTT.

(Explanation of Operation)

An operation of the exemplary embodiment will be described below with reference to FIGS. 3 and 4.

Figure 4:
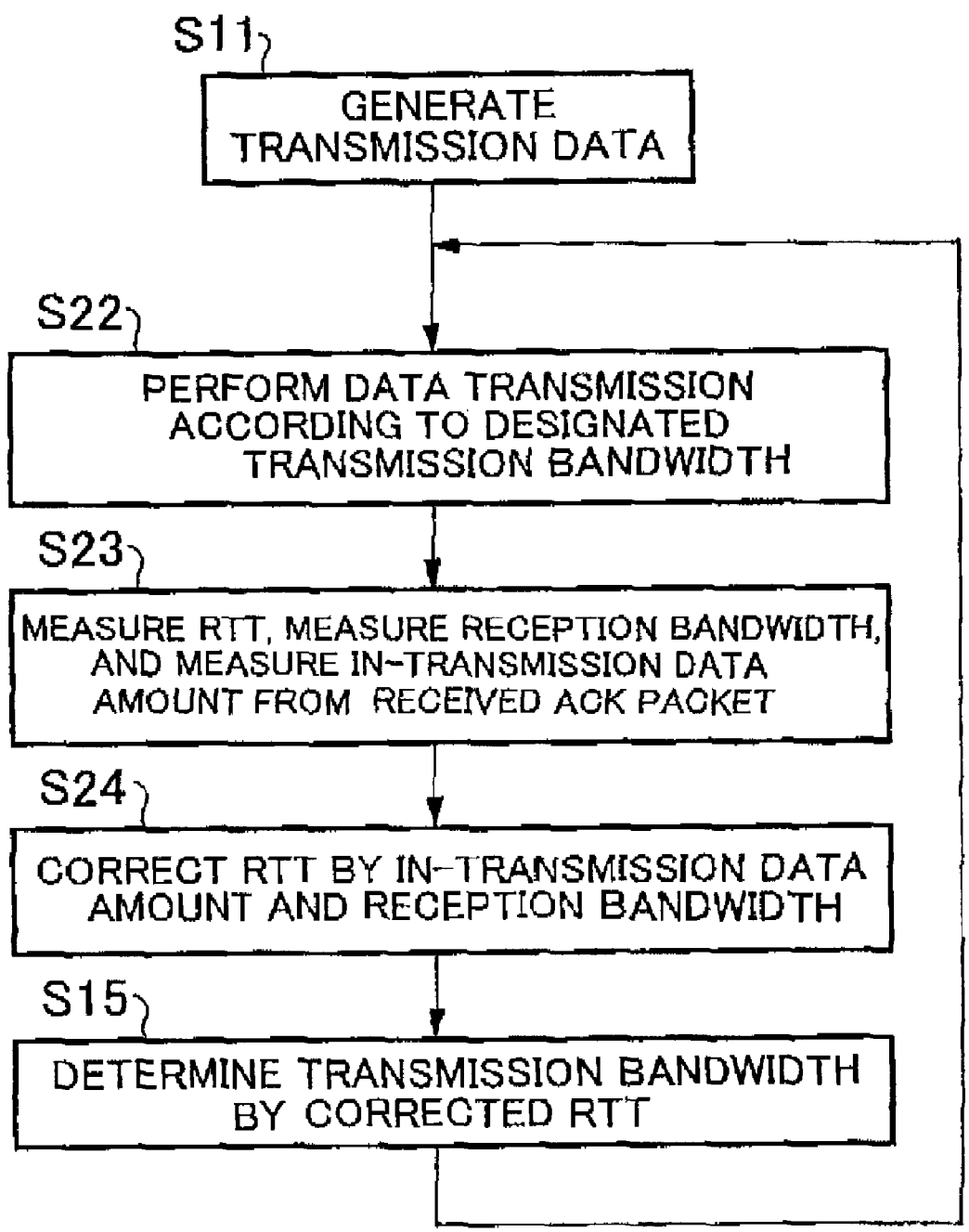
FIG. 4 is a flow chart showing an operation of a communication terminal according to the second embodiment.

FIG. 4 is a flow chart showing an operation of the communication terminal 2.

When transmission data is generated in the data generating unit 2-1 (step S11), the packet transmitting unit 2-2 packets the transmission data and transmits the packet according to a transmission bandwidth designated by the transmission bandwidth determining unit 2-5 of the congestion control unit 2-4 (step S22). At this time, unlike in the first exemplary embodiment, the transmission bandwidth is not measured. When an ACK packet corresponding to the transmitted packet reaches the packet receiving unit 2-3, the RTT measuring unit 2-6 measures an RTT and an RTTmin and measures a reception bandwidth in the reception bandwidth measuring unit 2-9 (step S23). In the in-transmission data amount measuring unit 2-8, an amount of in-transmission data is calculated from a difference between a sequence number of a finally transmitted packet and a sequence number confirmed to be received by ACK (step S23).

In the RTT correcting unit 2-7, the RTT is corrected by using the in-transmission data amount and the transmission bandwidth (step S24). For example, the corrected RTT may be calculated by the following equation:

Corrected $RTT$=max(in-transmission data amount/reception bandwidth), measured $RTT$min)

The corrected RTT may also be calculated as follows:

Corrected $RTT$=max(in-transmission data amount/reception bandwidth), measured $RTT$)

In this case, the latest measured values are used as in-transmission data amount and the reception bandwidth. However, a measured value obtained 1 RTT ago may be used as the in-transmission data amount to adjust measurement time of the in-transmission data amount to a packet to measurement time of the reception bandwidth to the packet.

The transmission bandwidth determining unit 2-5 controls a transmission bandwidth by using the value of the corrected RTT (step S15). As a control method for the transmission bandwidth, any control method using RTT is arbitrarily used.

For example, a calculation may be performed by using the following equation:

transmission bandwidth=previously calculated transmission bandwidth+($\alpha RTT-(RTT-RTT$min)/ $RTT$×previously calculated transmission bandwidth)×time constant By using the following equation in place of the above calculation, the same effect is obtained.

transmission bandwidth=previously calculated transmission bandwidth+($\alpha RTT-$(in-transmission data amount/$RTT$min–reception bandwidth))×time constant Third Exemplary Embodiment A third exemplary embodiment of the present invention will be described below with reference to the accompanying drawings.

(Explanation of Configuration)

Figure 5:
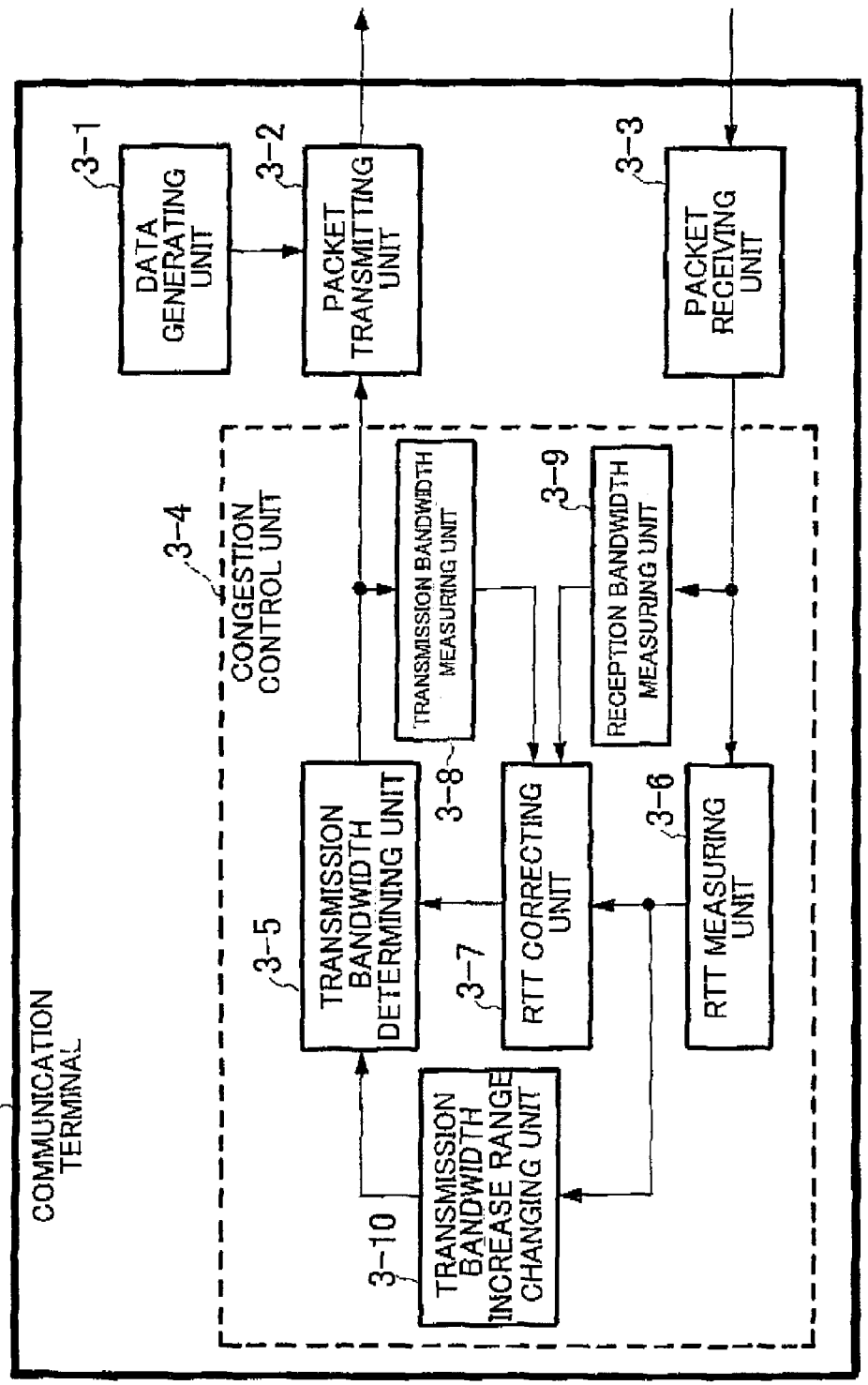
FIG. 5 is a block diagram showing a configuration of a terminal according to a third embodiment of the present invention.

FIG. 5 is a block diagram showing a configuration of a communication terminal 3 according to the exemplary embodiment. The communication terminal 3 has a configuration by adding a transmission bandwidth increase range changing unit 3-10 to the configuration of the communication terminal 1 according to the first exemplary embodiment.

The communication terminal 3 is constituted by a data generating unit 3-1 which generates transmission data, a packet transmitting unit 3-2 which outputs communication data to a network, a packet receiving unit 3-3 which receives an acknowledgement packet (ACK packet) from another communication terminal which communicates with the communication terminal 3, and a congestion control unit 3-4 which designates a transmission bandwidth for the packet transmitting unit 3-2.

The congestion control unit 3-4 is constituted by an RTT (Round Trip Time) measuring unit 3-6 which measures round-trip delay time each time an ACK packet is received, an in-transmission data amount measuring unit 3-8 which measures a transmission bandwidth, a reception bandwidth measuring unit 3-9 which measures a reception bandwidth, an RTT correcting unit 3-7 which corrects the RTT measured by using the values of the transmission bandwidth and the reception bandwidth, a transmission bandwidth determining unit 3-5 which determines a transmission bandwidth on the basis of the RTT, and a transmission bandwidth increase range changing unit 3-10 which changes an increase range of the transmission bandwidth on the basis of the measured RTT.

(Explanation of Operation)

Figure 6:
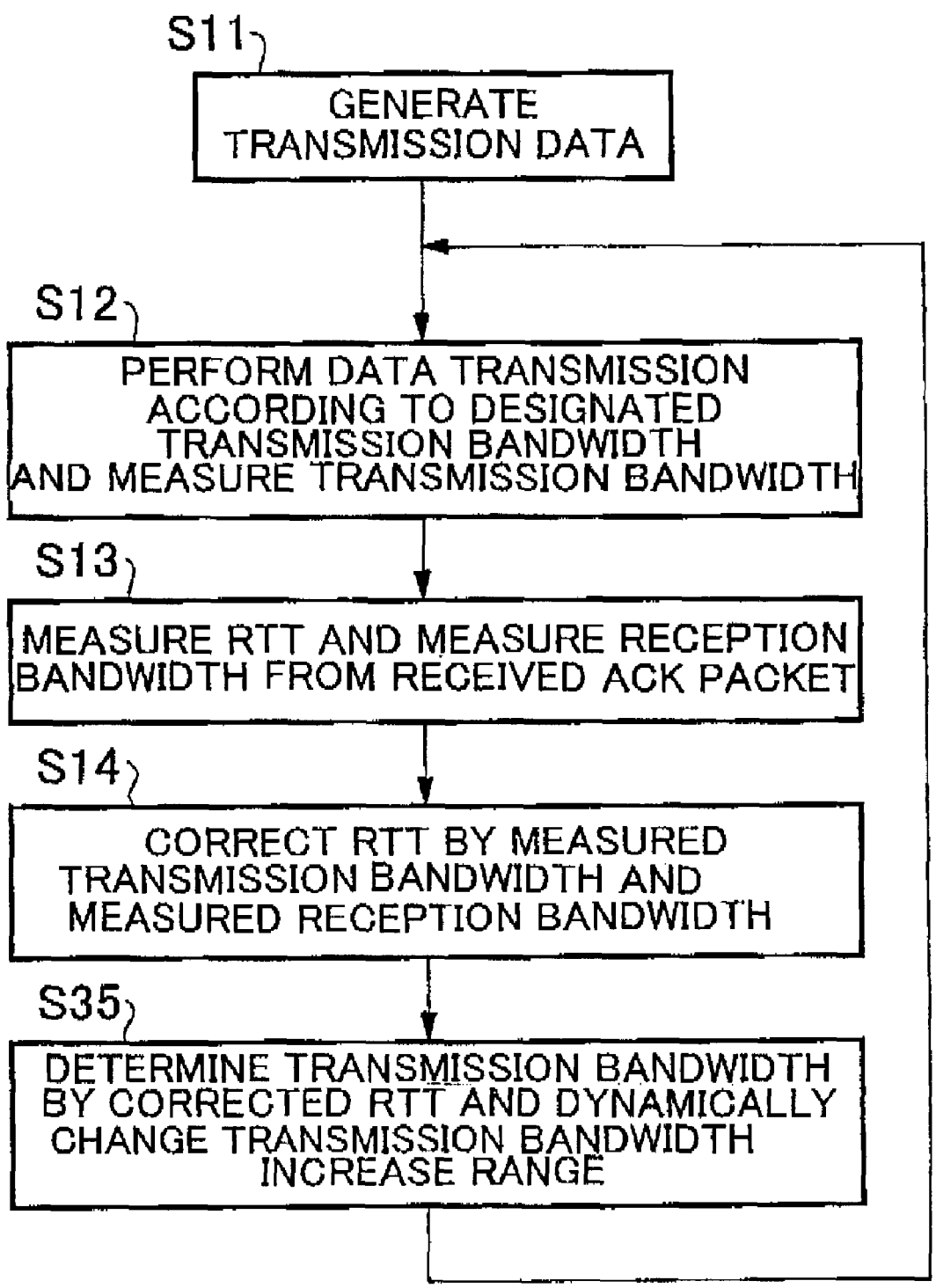
FIG. 6 is a flow chart showing an operation of a communication terminal according to the third embodiment.

An operation of the exemplary embodiment will be described below with reference to FIGS. 5 and 6. FIG. 6 is a flow chart showing an operation of the communication terminal 3. The same reference numerals as in FIG. 2 denote the same operations in FIGS. 5 and 6, and a description thereof will be omitted.

Operations (steps S11 and S12) in packet transmission are the same as those in the first exemplary embodiment.

Operations in packet reception performed until a corrected RTT is calculated (steps S13 and S14) are the same as those in the first exemplary embodiment.

In this exemplary embodiment, a method for calculating a transmission bandwidth is based on the method described below.

In a congestion control method which uses a queueing delay in a network as a control index, an amount of data accumulated in a queue is estimated, and a transmission bandwidth is controlled by the amount of data. More specifically, when the amount of data accumulated in the queue is larger than a preset target value, it is determined that the network is congested, and the transmission bandwidth is reduced. In contrast to this, when the amount of data accumulated in the queue is small, it is determined the network is not congested, and the transmission bandwidth is increased.

An amount of data accumulated in a queue can be generally estimated by the following manner. The minimum value (RTTmin) of a measured RTT is delay time obtained when data is not accumulated in a queue in a network at all. More specifically, this can be regarded as physical propagation delay time on a network line. When the measured RTT is larger than the value, the different therebetween, i.e., (RTT−RTTmin) can be regarded as waiting time in the queue. Since the amount of data accumulated in the queue is obtained by multiplying the waiting time in the queue by the transmission bandwidth, (RTT−RTTmin)×transmission bandwidth can be estimated as the amount of data accumulated in the queue.

A target of the amount of data accumulated in the queue is represented by $\alpha$, and it is considered that a control gain is decreased to stabilize control when the RTT is long. In this case, a congestion control method which uses a queueing delay in a network as a control index can be generally expressed by the following equation:

transmission bandwidth=previously calculated transmission bandwidth+($\alpha$/RTT−(RTT−RTTmin)/RTT×previously calculated transmission bandwidth)×time constant In the above method, when a target value $\alpha$ of the amount of data accumulated in the queue is large, the queueing delay increases. For this reason, the value $\alpha$ must be appropriately set to reduce the queueing delay. On the other hand, when the value $\alpha$ is small, an increase rate of the transmission bandwidth is disadvantageously low.

In the exemplary embodiment, a fixed value is not used as the value $\alpha$, and the value $\alpha$ is dynamically changed to perform optimum control according to network situation. In order to reduce a queueing delay, a function which decreases the value $\alpha$ when the queueing delay increases may be used. For this reason, the value $\alpha$ dynamically changes on the basis of the value of the measured RTT or the corrected RTT. Therefore, in the exemplary embodiment, the value $\alpha$ is defined as a decreasing function to (RTT−RTTmin). For example, the following function is used:

$$\alpha = 1/e^{(RTT-RTTmin) \times a}, \quad \text{(Equation 1)}$$

$$\alpha = 1/e^{(RTT-RTTmin)/(maximum\ RTT-RTTmin) \times b}, \quad \text{(Equation 2)}$$

$$\alpha = \max(c-(RTT-RTTmin)^*d, e), \quad \text{(Equation 3)}$$

$$\alpha = f^*B/e^{(RTT-RTTmin) \times a}, \quad \text{(Equation 4)}$$

$$\alpha = f^*B/\text{transmission bandwidth}/e^{(RTT-RTTmin) \times a}, \quad \text{(Equation 5)}$$

$$\alpha = f^*B/\text{transmission bandwidth}^*RTTmin/e^{(RTT \cdot RTT/e(RTT-RTTmin)) \times a}, \text{ or} \quad \text{(Equation 6)}$$

$$\alpha = f^*B/\text{transmission bandwidth}^*RTTmin/e^{(RTT-RTTmin) \times a} \quad \text{(Equation 7)}$$

In this case, a, b, c, d, e, and f are constants which are equal to or larger than 0. Reference symbol B is a value of a link bandwidth. As this value, a preset value or a value calculated by using an estimating method described in Japanese Patent Application No. 2005-027684 is used. In this case, when Equation (1) and Equation (2) express a case in which an exponentially decreasing function of a queueing delay is used as the target value $\alpha$, Equation (3) expresses a case in which a linearly decreasing function of a queueing delay is used, Equation (4) expresses a case in which a target value is multiplied by a link bandwidth, Equation (5) expresses a case in which a target value is multiplied by a value obtained by dividing the link bandwidth by a transmission bandwidth, Equation (6) expresses a case in which Equation (5) is multiplied by round-trip delay time, and Equation (7) expresses a case in which Equation (5) is multiplied by the minimum value of round-trip display time.

In Equations (6) to (7), the value $\alpha$ is multiplied by the round-trip delay time. However, as an alternative means, the value $\alpha$ is not multiplied by round-trip delay time, and an estimated data amount may be divided by the round-trip time. More specifically, the following equations are obtained:

transmission bandwidth=previously calculated transmission bandwidth+($\alpha$/RTT−(RTT−RTTmin)/RTT×previously calculated transmission bandwidth/RTT)×time constant, and Transmission bandwidth=previously calculated transmission bandwidth+($\alpha$/RTT−(RTT−RTTmin)/RTT×previously calculated transmission bandwidth/RTTmin)×time constant.

In the above calculating formulas, the term "(RTT−RTTmin)/RTT×previously calculated transmission bandwidth" may be replaced with (RTT−RTTmin)/constant g×previously calculated transmission bandwidth.

Furthermore, the time constant in the above calculating formula may be dynamically changed depending on an amount of data queued by a network. This is because it is determined that a congestion state is strong when the amount of data is large and congestion is early eliminated by largely changing the time constant. Therefore, the time constant may be defined as an increasing function to an absolute value of the difference. For example, the following function is used:

$$\text{time constant} = \max(f \times |A|, g)$$

where f and g are constants which are 0 or more, A is a value of the difference, and |A| is an absolute value of the difference.

The calculation of the value $\alpha$ and the calculation of the transmission bandwidth increasing range, i.e., /RTT−(RTT−RTTmin)/RTT×previously calculated transmission bandwidth)×time constant are performed by a transmission bandwidth increasing range changing unit.

When a plurality of sessions are present, a queueing delay elongates. However, the target value is set to be small depending on an increase of the queueing delay, an amount of data queued in each of the sessions decreases, and the amount of data queued by all the sessions decreases.

An amount of queued data is reduced in accordance with an increase in queueing delay to suppress a total of bandwidths to a bandwidth or less even though a plurality of sessions are present. As a result, delay time between transmission and reception terminals can be shortened.

Fourth Exemplary Embodiment

A fourth exemplary embodiment of the present invention will be described below with reference to the accompanying drawings.

(Explanation of Configuration)

Figure 7:
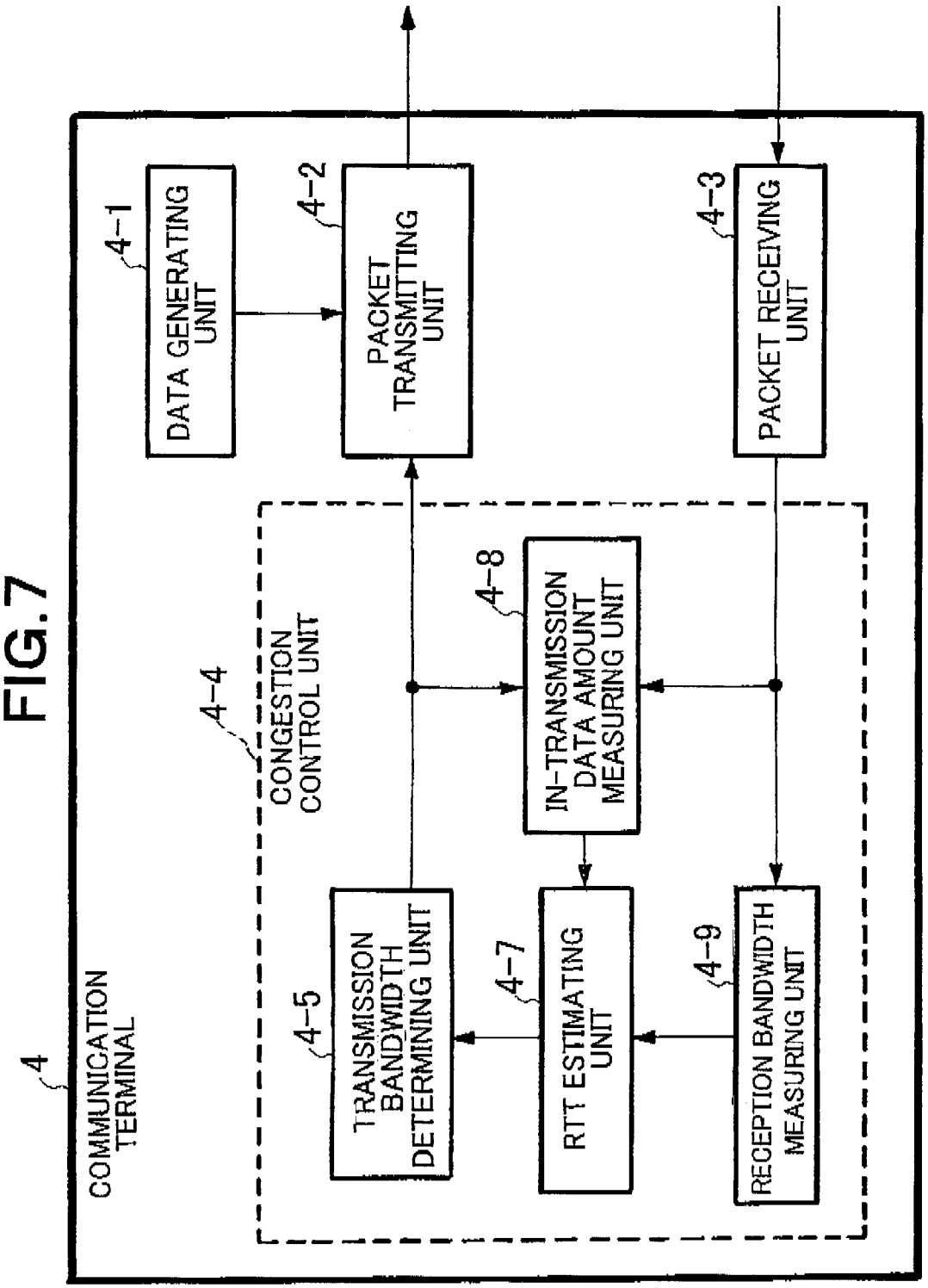
FIG. 7 is a block diagram showing a configuration of a terminal according to a fourth embodiment of the present invention.

FIG. 7 is a block diagram showing a configuration of a communication terminal 4 according to the exemplary embodiment. The communication terminal 4 is constituted by a data generating unit 4-1 which generates transmission data, a packet transmitting unit 4-2 which outputs communication data to a network, a packet receiving unit 4-3 which receives an acknowledgement packet (ACK packet) from a reception terminal, and a congestion control unit 4-4 which designates a transmission bandwidth for the packet transmitting unit 4-2.

The congestion control unit 4-4 is constituted by an in-transmission data amount measuring unit 4-8 which measures an amount of in-transmission data the ACK of which is not received, a reception bandwidth measuring unit 4-9 which measures a reception bandwidth, an RTT estimating unit 4-7 which estimates the RTT by using the reception bandwidth and the value of the in-transmission data amount, and a transmission bandwidth determining unit 4-5 which determines the transmission bandwidth on the basis of the RTT.

(Explanation of Operation)

An operation of the exemplary embodiment will be described below with reference to FIGS. 7 and 8. FIG. 8 is a flow chart showing an operation of the communication terminal 4.

Since processes (steps S11 and S12) in packet transmission are the same as those in the second exemplary embodiment, a description thereof will be omitted.

When an ACK packet corresponding to the transmitted packet reaches the packet receiving unit 4-3, a reception bandwidth is measured in the reception bandwidth measuring unit 4-9 (step S23). In the in-transmission data amount measuring unit 4-6, an amount of in-transmission data is calculated from a difference between a sequence number of a finally transmitted packet and a sequence number confirmed to be received by ACK (step S23).

In the RTT estimating unit 4-4, the RTT is estimated by using the in-transmission data amount and the transmission bandwidth (step S44). For example, the estimated RTT may be calculated by the following equation:

$$\text{estimated RTT} = \text{in-transmission data amount/reception bandwidth},$$

and

RTTmin is calculated as the minimum estimated RTT.

The transmission bandwidth is controlled on the basis of the calculated RTT (step S45). However, since the control method is the same as that in the second exemplary embodiment, a description thereof will be omitted.

Fifth Exemplary Embodiment

A fifth exemplary embodiment of the present invention will be described with reference to the accompanying drawings.

(Explanation of Configuration)

FIG. 9 is a block diagram showing a configuration of a communication terminal 5 according to the exemplary embodiment. The communication terminal 5 is constituted by a data generating unit 5-1 which generates transmission data, a packet transmitting unit 5-2 which outputs communication data to a network, a packet receiving unit 5-3 which receives an acknowledgement packet (ACK packet) from another communication terminal which communicates with the communication terminal 5, and a congestion control unit 5-4 which designates a transmission bandwidth for the packet transmitting unit 5-2.

The congestion control unit 5-4 is constituted by an RTT (Round Trip Time) measuring unit 5-6 which measures round-trip delay time each time an ACK packet is received, a reception bandwidth measuring unit 5-9 which measures a reception bandwidth, an RTT correcting unit 5-7 which corrects the RTT measured by using the value of the reception bandwidth, and a transmission bandwidth determining unit 5-5 which determines a transmission bandwidth on the basis of the RTT. The congestion control unit 5-4 has the same configuration as that of the congestion control unit 1-4 in the first exemplary embodiment except that the transmission bandwidth measuring unit 1-8 is not arranged.

(Explanation of Operation)

An operation of the exemplary embodiment will be described below with reference to FIGS. 9 and 10. FIG. 10 is a flow chart showing an operation of the communication terminal 5. Deriving of a corrected RTT in the exemplary embodiment will be described below. Since other operations are the same as those in the first exemplary embodiment, a description thereof will be omitted.

In the exemplary embodiment, an RTT is corrected by using only a reception bandwidth without measuring a transmission bandwidth. The RTT correcting unit 5-7, by using a current reception bandwidth and a reception bandwidth measured in the past, the RTT is corrected by a ratio of the reception bandwidths (step S54). For example, the corrected RTT may be calculated by the following equation:

$$\text{corrected RTT} = \max(\text{measured RTT} \times (\text{reception bandwidth measured in past/current reception bandwidth}), RTT\text{min}).$$

Sixth Exemplary Embodiment

A sixth exemplary embodiment of the present invention will be described below with reference to the accompanying drawings.

(Explanation of Configuration)

FIG. 11 is a block diagram showing a configuration of a system according to the exemplary embodiment. This system is constituted by a communication terminal 6-1 serving as a transmission terminal, a communication terminal 6-2 serving as a reception terminal, and a network 6-3. Since a configuration of the communication terminal 6-1 is the same as that of the communication terminal 1 in the first exemplary embodiment, a description thereof will be omitted. Any one of the communication terminals in the second to fifth exemplary embodiments can also be used. The communication terminal 6-2 is constituted by a data reconstructing unit 6-5 which reconstructs communication data from a received packet, a data receiving unit 6-4 which receives and processes the reconstructed data, and an ACK generating unit 6-6 which generates an ACK packet and returns the ACK packet to the communication terminal 6-1.

(Explanation of Operation)

An operation of the exemplary embodiment will be described below with reference to FIG. 11.

A packet transmitted from the transmission terminal 6-1 reaches the reception terminal 6-2 through a network 6-3.

The data reconstructing unit 6-5 extracts data from the received packet, reconstructs original data, and transmits the data to the data receiving unit 6-4. The data receiving unit 6-4 processes the received data by various reception applications.

The data reconstructing unit 6-5 notifies the ACK generating unit 6-6 of a number of received data. The ACK generating unit 6-6 generates an ACK packet on the basis of the number and transmits the ACK packet to the communication terminal 6-1. The number of the data notified by the ACK packet is a number of data which is confirmed to be received by the communication terminal 6-2. The number and data having numbers before the number are reliably received by the communication terminal 6-2. Therefore, when the communication terminal 6-1 receives the ACK packet, data having numbers up to the number written in the packet are not retransmitted. For this reason, these data may be wasted on the communication terminal 6-1 side. When packet waste occurs on a transmission path, the communication terminal 6-2 writes the number of the same data in a plurality of ACKs to notify the communication terminal 6-1 that data having numbers subsequent to the number is not received and to urge the communication terminal 6-1 to perform retransmission. As another method, a NACK (Negative ACK) which explicitly shows the occurrence of packet waste may be transmitted from the communication terminal 6-2 to the communication terminal 6-1.

The communication terminals according to the exemplary embodiments described above can be constituted by hardware using dedicated ICs and the like. However the communication terminals can be realized by software using a computer. More specifically, for example, any one of the communication terminals shown in FIGS. 1, 3, 5, 7, and 9 is constituted by a computer as shown in FIG. 12, and functions of the communication terminals can be realized by programs in which any one of flows shown in FIGS. 2, 4, 6, 8, and 10 is written. The program in which any one of the flows shown in FIGS. 2, 4, 6, 8, and 10 is written is stored in a disk device 103 such as a hard disk device or a storage device (in this case, a disk device) such as a ROM (Read On Memory), and a program which realizes the functions of the communication terminal is executed by a CPU 105. An input unit 102 is an input device such as a keyboard. A transmitting and receiving unit 101 corresponds to a packet transmitting unit and a packet receiving unit. An LCD (liquid crystal device) 107 displays an information processing state or a determination result. Reference numeral 104 denotes a bus such as a data bus. Reference numeral 106 denotes a memory such as a DRAM which stores information required for information processing in the CPU 105.

The data required for the execution process is stored in a random access memory (RAM) such as the DRAM. The hard disk device or the storage device such as the ROM serves as a computer readable medium containing the program (program product) which realizes the functions of the communication terminal. A computer readable medium may be a CDROM, a semiconductor memory such as a flash memory, or a DVD which the program is storage.

The present invention relates a communication terminal, a communication system, a congestion control method, and a congestion control program. In particular, the present invention can be applied to a communication terminal, a communication system, a congestion control method, and a congestion control program which perform low-delay communication by using a broadband line.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A communication terminal used in a communication system which sets a communication session between a plurality of communication terminals through a network to perform data transmission and reception, comprising:
   a dedicated IC which measures round-trip delay time or one-way delay time between the communication terminal and another terminal for performing transmission and reception with the communication terminal, on the basis of received acknowledgement from the another terminal;
   a dedicated IC which measures a transmission bandwidth of data to be transmitted;
   a reception bandwidth measuring dedicated IC which measures a reception bandwidth in the another terminal on the basis of the received acknowledgement;
   a correcting dedicated IC which corrects a value of the round-trip delay time or the one-way delay time by using the reception bandwidth and the transmission bandwidth; and
   a determining dedicated IC which determines a transmission bandwidth by the round-trip delay time or one-way delay time corrected by the correcting dedicated IC.

2. The communication terminal according to claim 1, further comprising a dedicated IC which measures an amount of in-transmission data,
   wherein the correcting dedicated IC corrects the round-trip delay time or one-way delay time, using the following equation;

the corrected round-trip delay time or one-way delay time=max ((in-transmission data amount/reception bandwidth), measured round-trip delay time or one-way delay time).

3. The communication terminal according to claim 2, wherein a large one of the value of the corrected round-trip delay time or corrected one-way delay time and the minimum value of the measured round-trip delay time and measured one-way delay time is output to the determining dedicated ICas the corrected round-trip delay time or one-way delay time by the correcting dedicated IC.

4. A communication terminal used in a communication system which sets a communication session between a plurality of communication terminals through a network to perform data transmission and reception, comprising:
   a dedicated IC which measures round-trip delay time or one-way delay time between the communication terminal and another terminal for performing transmission and reception with the communication terminal, on the basis of received acknowledgement from the another terminal;
   a dedicated IC which measures a transmission bandwidth of data to be transmitted;
   a reception bandwidth measuring dedicated IC which measures a reception bandwidth in the another terminal on the basis of the received acknowledgment;
   a correcting dedicated IC which corrects a value of the round-trip delay time or the one-way delay time by using the reception bandwidth and the transmission bandwidth; and
   a determining dedicated IC which determines a transmission bandwidth by the round-trip delay time or one-way delay time corrected by the correcting dedicated IC,
   wherein the correcting dedicated IC multiplies the measured round-trip delay time or measured one-way delay time by a value obtained by dividing the transmission bandwidth by the reception bandwidth, to correct the round-trip delay time or the one-way delay time.

5. The communication terminal according to claim 4, wherein a large one of the value of the corrected round-trip delay time or corrected one-way delay time and the value of the measured round-trip delay time or measured one-way delay time is output to the determining dedicated IC as the corrected round-trip delay time or one-way delay time by the correcting dedicated IC.

6. The communication terminal according to claim 4, wherein a large one of the value of the corrected round-trip delay time or corrected one-way delay time and the minimum value of the measured round-trip delay time and measured one-way delay time is output to the determining dedicated IC as the corrected round-trip delay time or one-way delay time by the correcting dedicated IC.

7. A communication system comprising:
   a communication terminal according to claim 1, and another communication terminal which transmits and receives data to and from the communication terminal, wherein the another communication terminal transmits an ACK packet in response to data transmission from the communication terminal, and the communication terminal measures the round-trip delay time or one-way delay time on the basis of the ACK packet.

8. A congestion control method in a communication terminal of a communication system which sets a communication session between a plurality of communication terminals through a network to perform data transmission and reception, comprising:

the first step of measuring round-trip delay time or one-way delay time between the communication terminal and another terminal for performing transmission and reception with the communication terminal, and measuring a reception bandwidth in the another terminal, on the basis of received acknowledgement from the another terminal;

the second step of measuring a transmission bandwidth of data to be transmitted;

the third step of correcting a value of the round-trip delay time or the one-way delay time by using the reception bandwidth and the transmission bandwidth;

the fourth step of determining a transmission bandwidth by the round-trip delay time or one-way delay time corrected in the second step.

9. The congestion control method according to claim 8, further comprising the fifth step of measuring an amount of in-transmission data;

wherein in the third step, the round-trip delay time or one-way delay time is corrected by using the following equation;

the corrected round-trip delay time or one-way delay time=max ((in-transmission data amount/reception bandwidth), measured round-trip delay time or one-way delay time).

10. The congestion control method according to claim 9, wherein in the third step, a large one of the value of the corrected round-trip delay time or corrected one-way delay time and the value of the measured round-trip delay time or measured one-way delay time is used as the corrected round-trip delay time or one-way delay time.

11. The congestion control method according to claim 9, wherein in the third step, a large one of the value of the corrected round-trip delay time or corrected one-way delay time and the minimum value of the measured round-trip delay time and measured one-way delay time is output to the determining unit as the corrected round-trip delay time or one-way delay time.

12. A congestion control method in a communication terminal of a communication system which sets a communication session between a plurality of communication terminals through a network to perform data transmission and reception, comprising:

the first step of measuring round-trip delay time or one-way delay time between the communication terminal and another terminal for performing transmission and reception with the communication terminal, and measuring a reception bandwidth in the another terminal, on the basis of received acknowledgement from the another terminal;

the second step of measuring a transmission bandwidth of data to be transmitted;

the third step of correcting a value of the round-trip delay time or the one-way delay time by using the reception bandwidth and the transmission bandwidth; and the fourth step of determining a transmission bandwidth by the round-trip delay time or one-way delay time corrected in the second step;

wherein in the third step, the measured round-trip time or the measured one-way delay time is multiplied by a value obtained by dividing the transmission bandwidth by the reception bandwidth, to correct the round-trip delay time or one-way delay time.

13. The congestion control method according to claim 12, wherein in the third step, a large one of the value of the corrected round-trip delay time or corrected one-way delay time and the value of the measured round-trip delay time or measured one-way delay time is used as the corrected round-trip delay time or one-way delay time.

14. The congestion control method according to claim 12, wherein in the third step, a large one of the value of the corrected round-trip delay time or corrected one-way delay time and the minimum value of the measured round-trip delay time and measured one-way delay time is output to the determining unit as the corrected round-trip delay time or one-way delay time.

15. A non-transitory computer-readable storage medium storing a program for causing a computer serving as a communication terminal of a communication system which sets a communication session between a plurality of communication terminals through a network to perform data transmission and reception to execute the steps of:

the first step of measuring round-trip delay time or one-way delay time between the communication terminal and another terminal for performing transmission and reception with the communication terminal, and measuring a reception bandwidth in the another terminal, on the basis of received acknowledgement from the another terminal;

the second step of measuring a transmission bandwidth of data to be transmitted;

the third step of correcting a value of the round-trip delay time or the one-way delay time by using the reception bandwidth and the transmission bandwidth; and the fourth step of determining a transmission bandwidth by the round-trip delay time or one-way delay time corrected in the third step.

16. A non-transitory computer-readable storage medium storing a program for causing a computer serving as a communication terminal of a communication system which sets a communication session between a plurality of communication terminals through a network to perform data transmission and reception to execute the steps of:

the first step of measuring an amount of in-transmission data;

the second step of measuring a reception bandwidth in another terminal for performing transmission and reception with the communication terminal, on the basis of received acknowledgement from the another terminal;

the third step of measuring a transmission bandwidth of data to be transmitted;

the fourth step of setting a value obtained by dividing the measured amount of in-transmission data by the reception bandwidth and the transmission bandwidth as the round-trip delay time or one-way delay time; and the fifth step of determining a transmission bandwidth by the round-trip delay time or one-way delay time estimated in the fourth step.

* * * * *

UNITED STATES PATENT AND TRADEMARK OFFICE
CERTIFICATE OF CORRECTION

PATENT NO.        : 8,004,985 B2
APPLICATION NO.   : 12/024685
DATED             : August 23, 2011
INVENTOR(S)       : Hideyuki Shimonishi It is certified that error appears in the above-identified patent and that said Letters Patent is hereby corrected as shown below:

In the Specification

Column 11, Line 51: Delete "$\alpha = f*B/e^{(RTT-RTTmin) \times a}$," and insert --$\alpha = f*B/e^{(RTT-RTTmin) \times a}$,--

Column 11, Line 55: Delete "$\alpha = f*B/\text{transmission bandwidth}*RTTmin/e^{(RTT \cdot RTT/e(RTT \cdot RTTmin) \times a}$, or" and insert --$\alpha = f*B/\text{transmission bandwidth}*RTT/e^{(RTT \cdot RTTmin) \times a}$, or--

Signed and Sealed this
Ninth Day of September, 2014

Michelle K. Lee
*Deputy Director of the United States Patent and Trademark Office*